(12) United States Patent
Shock (10) Patent No.: US 12,325,558 B2
(45) Date of Patent: *Jun. 10, 2025

(54) FUEL CAP ASSEMBLY WITH CYLINDRICAL COUPLER

(71) Applicant: Fuel Automation Station, LLC, Birmingham, MI (US)

(72) Inventor: Ricky Dean Shock, Victoria, TX (US)

(73) Assignee: Fuel Automation Station, LLC, Birmingham, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/490,082

(22) Filed: Oct. 19, 2023

(65) Prior Publication Data

US 2024/0043179 A1 Feb. 8, 2024

Related U.S. Application Data

(63) Continuation of application No. 16/745,567, filed on Jan. 17, 2020, now Pat. No. 11,827,421.

(51) Int. Cl.
*B60K 15/04* (2006.01)
*B60K 15/03* (2006.01)
(Continued)

(52) U.S. Cl.
CPC ........ *B65D 41/325* (2013.01); *B60K 15/0406* (2013.01); *B65D 90/48* (2013.01);
(Continued)

(58) Field of Classification Search
CPC .. B65D 41/325; B65D 90/48; B65D 2581/00; B60K 15/0406; B60K 2015/03217; F02M 37/04
See application file for complete search history.

(56) References Cited

U.S. PATENT DOCUMENTS 2,340,070 A 1/1944 McCauley et al.
2,516,150 A 7/1950 Samiran
(Continued)

FOREIGN PATENT DOCUMENTS

DE 1147397 4/1963
DE 20106400 10/2001
(Continued)

OTHER PUBLICATIONS

Oilfield Business: Technologies. Frac Shack Inc. introduces world's first Bi-Fuel Distribution Unit for hydraulic fracturing industry. Texas Oil & Gas: The National Magazine for Oil & Gas in Texas. vol. 4, Issue 2. 2015. p. 27.
(Continued)

*Primary Examiner* — Jason K Niesz
(74) *Attorney, Agent, or Firm* — Carlson, Gaskey & Olds, P.C.

(57) ABSTRACT

A fuel cap assembly according to an example of the present disclosure includes a fuel cap and a pipe stub that extends from the fuel cap and defines a first internal passage. A sensor element and a fuel tube are adjacent to each other and both extend from the fuel cap through the first internal passage. A cylindrical coupler is composed of an elastomer and defines a second internal passage that extends between an inlet port and an outlet port. The inlet port has a first inner diameter and the pipe stub is receivable into the inlet port. The outlet port has a second inner diameter that differs from the first inner diameter.

18 Claims, 7 Drawing Sheets

(51) Int. Cl.
  *B65D 41/32* (2006.01)
  *B65D 90/48* (2006.01)
  *F02M 37/04* (2006.01)
(52) U.S. Cl.
  CPC ... *F02M 37/04* (2013.01); *B60K 2015/03217* (2013.01); *B65D 2581/00* (2013.01)

(56) References Cited

U.S. PATENT DOCUMENTS

| | | | |
|---|---|---|---|
| 2,769,572 A | 11/1956 | Harman et al. | |
| 2,777,461 A | 1/1957 | Wildhaber | |
| 2,966,921 A | 1/1961 | Whiteman | |
| 3,028,010 A | 4/1962 | Headrick | |
| 3,136,295 A | 6/1964 | Gramo | |
| 3,547,141 A | 12/1970 | Alexander | |
| 3,605,798 A | 9/1971 | Green et al. | |
| 3,618,643 A | 11/1971 | Thomson | |
| 3,625,399 A | 12/1971 | Heisler | |
| 3,656,134 A | 4/1972 | Brown | |
| 3,677,284 A | 7/1972 | Mendez | |
| 3,881,509 A | 5/1975 | Newton | |
| 4,139,019 A | 2/1979 | Bresie et al. | |
| 4,284,210 A | 8/1981 | Horak | |
| 4,511,311 A | 4/1985 | Olson | |
| 4,591,115 A | 5/1986 | DeCarlo | |
| 4,651,788 A | 3/1987 | Grosskreuz et al. | |
| 4,728,005 A | 3/1988 | Jacobs et al. | |
| 4,930,665 A | 6/1990 | Devine | |
| 5,406,988 A | 4/1995 | Hopkins | |
| 5,454,408 A | 10/1995 | DiBella et al. | |
| 5,465,766 A | 11/1995 | Siegele et al. | |
| 5,503,199 A | 4/1996 | Whitley, II et al. | |
| 5,538,051 A | 7/1996 | Brown et al. | |
| 5,551,309 A | 9/1996 | Goossens et al. | |
| 5,651,400 A | 7/1997 | Corts et al. | |
| 5,660,358 A | 8/1997 | Grafwallner et al. | |
| 5,708,424 A | 1/1998 | Orlando et al. | |
| 5,749,339 A | 5/1998 | Graham et al. | |
| 5,887,567 A | 3/1999 | White et al. | |
| 5,927,603 A | 7/1999 | McNabb | |
| 5,884,675 A | 12/1999 | Krasnov | |
| 6,098,646 A | 8/2000 | Hennemann et al. | |
| 6,206,056 B1 | 3/2001 | Lagache | |
| 6,564,615 B1 | 5/2003 | Carter | |
| 6,601,000 B1 | 7/2003 | Barlian et al. | |
| 6,651,706 B2 | 11/2003 | Litt | |
| 6,697,705 B2 | 2/2004 | Johnson et al. | |
| 6,745,801 B1 | 6/2004 | Cohen et al. | |
| 6,755,225 B1 | 6/2004 | Niedwiecki et al. | |
| 6,761,194 B1 | 7/2004 | Blong | |
| 6,779,569 B1 | 8/2004 | Teer, Jr. et al. | |
| 6,786,245 B1 | 9/2004 | Eichelberger et al. | |
| 6,867,729 B2 | 3/2005 | Berry et al. | |
| 7,063,276 B2 | 6/2006 | Newton | |
| 7,106,026 B2 | 9/2006 | Moore | |
| 7,353,808 B2 | 4/2008 | Kakoo | |
| 7,401,511 B2 | 7/2008 | Dietmeier | |
| 7,415,995 B2 | 8/2008 | Plummer et al. | |
| 7,458,543 B2 | 12/2008 | Cutler et al. | |
| 7,568,507 B2 | 8/2009 | Farese et al. | |
| 7,610,806 B2 | 11/2009 | Skinner | |
| 7,602,143 B2 | 12/2009 | Capizzo | |
| 7,628,182 B2 | 12/2009 | Poulter | |
| 7,937,215 B2 | 5/2011 | Humphrey | |
| 7,938,151 B2 | 5/2011 | Hockner | |
| 8,069,885 B2 | 12/2011 | Kederer et al. | |
| 8,448,750 B2 | 5/2013 | Gaugush et al. | |
| 8,959,998 B2 | 2/2015 | Birtcher et al. | |
| 9,346,662 B2 * | 5/2016 | Van Vliet | B67D 7/0401 |
| 9,371,830 B2 | 6/2016 | Moffitt, Jr. | |
| 9,371,831 B2 | 6/2016 | Moffitt, Jr. | |
| 9,434,598 B2 | 9/2016 | Pick et al. | |
| 9,586,805 B1 | 3/2017 | Shock | |
| 9,725,295 B2 | 8/2017 | McKay et al. | |
| 2001/0017815 A1 | 8/2001 | Ackermann et al. | |
| 2004/0163731 A1 | 8/2004 | Eichelberger et al. | |
| 2004/0187950 A1 | 9/2004 | Cohen et al. | |
| 2005/0109561 A1 | 5/2005 | Chopra | |
| 2007/0079891 A1 | 4/2007 | Farese et al. | |
| 2007/0164031 A1 | 7/2007 | Holz | |
| 2007/0181212 A1 | 8/2007 | Fell | |
| 2008/0078244 A1 | 4/2008 | Dietmeier | |
| 2009/0314384 A1 | 12/2009 | Brakefield et al. | |
| 2010/0018605 A1 | 1/2010 | Bentivoglio | |
| 2011/0197988 A1 | 8/2011 | Van Vliet et al. | |
| 2016/0076533 A1 | 3/2016 | Moffitt, Jr. | |
| 2019/0001812 A1 * | 1/2019 | Moore | B60K 15/04 |

FOREIGN PATENT DOCUMENTS

| | | |
|---|---|---|
| DE | 10309307 | 9/2004 |
| DE | 102006025025 | 12/2006 |
| DE | 102006038652 | 2/2008 |
| EP | 0161042 | 11/1985 |
| EP | 0433041 | 6/2001 |
| GB | 2485832 | 5/2012 |
| RU | 28347 | 3/2003 |
| RU | 91135 | 1/2010 |
| RU | 2452668 | 1/2012 |
| SU | 949644 | 8/1982 |
| WO | 0177006 | 10/2001 |
| WO | 03029721 | 4/2003 |
| WO | 03093118 | 11/2003 |
| WO | 2006005686 | 1/2006 |
| WO | 2006116572 | 11/2006 |
| WO | 2007087849 | 8/2007 |
| WO | 2008083830 | 7/2008 |
| WO | 2009026607 | 3/2009 |
| WO | 20090608065 | 6/2009 |

OTHER PUBLICATIONS

Frac Shack International. Publications & Endorsements. Retrieved Aug. 23, 2016 from: http://www.fracshack.com.
Frac Shack International. Technology. Retrieved Aug. 23, 2016 from: http://www.fracshack.com.
Frac Shack International. Design Benefits. Retrieved Aug. 23, 2016 from: http://www.fracshack.com.
Frac Shack International. Service. Retrieved Aug. 23, 2016 from: http://www.fracshack.com.
Frac Shack International. Frac Shack Series- Series A. Retrieved Aug. 23, 2016 from: http://www.fracshack.com.
Frac Shack International. Frac Shack Series- Series B. Retrieved Aug. 23, 2016 from: http://www.fracshack.com.
Frac Shack International. Frac Shack Series- Series C. Retrieved Aug. 23, 2016 from: http://www.fracshack.com.
Frac Shack International. Frac Shack Series- Series D. Retrieved Aug. 23, 2016 from: http://www.fracshack.com.
Frac Shack International. Frac Shack Series- Series E. Retrieved Aug. 23, 2016 from: http://www.fracshack.com.
Frac Shack International. Frac Shack Series- Series EG. Retrieved Aug. 23, 2016 from: http://www.fracshack.com.
Mann Tek. Dry Disconnect Couplings. Retrieved Jul. 22, 2016 from: http://www.manntek.com/products/drydisconnectcouplings p. 1-4.
Mann Tek. Dry Aviation Couplings. Retrieved Jul. 22, 2016 from: http://www.manntek.com/products/dryaviationcouplings p. 1-4.
Waterman, J. (2013). Better Safe than Sorry: Frac Shack a welcome addition to the oil patch. Jan. 2, 2013. Retrieved Aug. 23, 2016 from: http://www.pipelinenewsnorth.ca/better-safe-than-sorry-1. 1123066.
U.S. Appl. No. 15/655,115, filed Jul. 20, 2017.
U.S. Appl. No. 15/782,335, filed Oct. 12, 2017.
U.S. Appl. No. 15/673,730, filed Aug. 10, 2017.
U.S. Appl. No. 15/673,796, filed Aug. 10, 2017.
U.S. Appl. No. 15/416,198 filed Jan. 26, 2017.
U.S. Appl. No. 15/703,285, filed Sep. 13, 2017.
Shimazaki, H. (1986). Development of centralized fueling and management system of kerosene heating machine. Nisseki Technical Review, vol. 28(4). Jul. 1986. pp. 184-188.

(56) References Cited

OTHER PUBLICATIONS

Technical Document. Surface vehicle standard. SAE International. Sep. 2014. pp. 1-5.

* cited by examiner

FUEL CAP ASSEMBLY WITH CYLINDRICAL COUPLER

CROSS-REFERENCE TO RELATED APPLICATIONS

This application is a continuation of U.S. application Ser. No. 16/745,567, which was filed on Jan. 17, 2020, and is incorporated by reference herein in its entirety.

BACKGROUND

This application relates to fuel cap assemblies, and more particularly to a coupler for mounting fuel cap assemblies to fuel tanks.

Mobile fuel distribution systems are known that are transported to temporary work sites for dispensing fuel into fuel tanks of equipment. Some such systems utilize fuel cap sensors that extend into respective fuel tanks to determine fuel levels in the fuel tanks for automated refueling. Such mobile fuel distribution systems are temporarily used at a given work site and, once the equipment is no longer used at the site, are then moved to a next worksite.

SUMMARY

A fuel cap assembly according to an example of the present disclosure includes a fuel cap and a pipe stub that extends from the fuel cap and defines a first internal passage. A sensor element and a fuel tube are adjacent to each other and both extend from the fuel cap through the first internal passage. A cylindrical coupler is composed of an elastomer and defines a second internal passage that extends between an inlet port and an outlet port. The inlet port has a first inner diameter and the pipe stub being receivable into the inlet port. The outlet port has a second inner diameter that differs from the first inner diameter.

In a further embodiment of any of the foregoing embodiments, the second inner diameter is less than the first inner diameter.

In a further embodiment of any of the foregoing embodiments, the fuel cap assembly includes at least one adjustable hose clamp that clamps an outer surface of the cylindrical coupler radially inwards.

In a further embodiment of any of the foregoing embodiments, the outer surface of the cylindrical coupler has at least one annular groove, and each of the at least one adjustable hose clamps is disposed in a respective one of the at least one annular grooves.

In a further embodiment of any of the foregoing embodiments, an inner surface of the cylindrical coupler has a frustoconical section that transitions the second internal passage from the first inner diameter to the second inner diameter.

In a further embodiment of any of the foregoing embodiments, a radially inner surface of the cylindrical coupler has a step that transitions the second internal passage from the first inner diameter to the second inner diameter.

In a further embodiment of any of the foregoing embodiments, the fuel cap assembly includes an additional cylindrical coupler that has an additional inlet port having an additional first inner diameter, and an additional outlet port having an additional second inner diameter that differs from the first inner diameter and second inner diameter. The pipe stub is receivable into the additional inlet port such that the fuel cap is interchangeable between the cylindrical coupler and the additional cylindrical coupler.

A fuel cap assembly kit according to an example of the present disclosure includes a fuel cap and a pipe stub that extends from the fuel cap and defines a first internal passage. A sensor element and a fuel tube are adjacent to each other and both extend from the fuel cap through the first internal passage. A plurality of cylindrical couplers are provided, each composed of an elastomer, and each defining a respective second internal passage that extends between an inlet port and an outlet port, the inlet port having a first inner diameter and the outlet port having a second inner diameter. Each first inner diameter is substantially the same size and is sized to interchangeably receive and engage the pipe stub. Each of the second inner diameters have sizes that differ from each other and that differ from the respective first inner diameters.

In a further embodiment of any of the foregoing embodiments, each of the respective second diameters are less than each of the respective first inner diameters.

In a further embodiment of any of the foregoing embodiments, the first end of each cylindrical coupler includes a first annular groove in an outer surface of the cylindrical coupler, and the second end of each cylindrical couple includes a second annular groove in the outer surface of the cylindrical coupler.

In a further embodiment of any of the foregoing embodiments, the fuel cap assembly kit includes a first hose clamp sized to fit in the respective first annular grooves and configured to clamp one of the respective first annular grooves radially inwards, and a second hose clamp sized to fit in the respective second annular grooves and configured to clamp one of the respective second annular grooves radially inwards.

In a further embodiment of any of the foregoing embodiments, outside of the first and second annular grooves, each cylindrical coupler has an outer diameter that is substantially the same along an entire length of the cylindrical coupler.

In a further embodiment of any of the foregoing embodiments, an inner surface of at least one of the cylindrical couplers has a frustoconical section that transitions the second internal passage of the cylindrical coupler from the first inner diameter to the second inner diameter.

In a further embodiment of any of the foregoing embodiments, a radially inner surface of at least one of the cylindrical couplers has a step that transitions the second internal passage from the first inner diameter to the second inner diameter.

A fuel dispensing system according to an example of the present disclosure includes a mobile fuel distribution station including a manifold having a plurality of outlets and a plurality of hoses. Each hose has a first end configured to receive fuel from a respective one of the outlets, and has an opposing second end. The fuel dispensing system also includes a plurality of fuel cap assemblies, each including a fuel cap, a pipe stub that extends from the fuel cap and defines a first internal passage, a sensor element and a fuel tube adjacent to each other and both extending from the fuel cap through the first internal passage. The fuel tube is configured to receive fuel through the fuel cap from the second end of a respective one of the hoses. A cylindrical coupler is composed of an elastomer and defines a second internal passage that extends between an inlet port and an outlet port. The inlet port has a first inner diameter and the pipe stub is receivable into the inlet port. The outlet port has a second inner diameter that differs from the first inner diameter.

In a further embodiment of any of the foregoing embodiments, each fuel cap assembly includes a first adjustable hose clamp that is disposed in a first annular groove in an outer surface of the first end of the cylindrical coupler and clamps the first end radially inwards onto the pipe stub, and a second adjustable hose clamp that is disposed in a second annular groove in an outer surface of the second end of the cylindrical coupler and clamps the second end radially inwards.

A method of mounting a fuel cap assembly to a fuel tank according to an example of the present disclosure includes providing a fuel cap assembly kit having a fuel cap, a pipe stub that extends from the fuel cap and defines a first internal passage, a sensor element and fuel tube disposed adjacent to each other and both extending from the fuel cap through the first internal passage. The kit also has a plurality of cylindrical couplers, each enabling the fuel cap to be fit to a different respective size of fuel tank flange, composed of an elastomer, and defining a second internal passage that extends between an inlet port and an outlet port. The inlet port having a first inner diameter, and the outlet port having a second inner diameter. Each respective first inner diameter is substantially the same, each of the second inner diameters have sizes that differ from each other and from the respective first inner diameters. The pipe stub is interchangeably receivable into any of the inlet ports. The method also includes determining a diameter of an inlet flange of a fuel tank, selecting one of the cylindrical couplers based on the size of the diameter of the inlet flange and the second inner diameter of the selected cylindrical coupler, and attaching the inlet port of the selected cylindrical coupler to the pipe stub, such that the pipe stub engages a radially inner surface of the selected cylindrical coupler at the inlet port. The method also includes attaching the outlet port of the selected cylindrical coupler to the inlet flange of the fuel tank, such that the inlet flange of the fuel tank engages the radially inner surface of the selected cylindrical coupler at the outlet port, and such that the sensor element and fuel tube extend from the fuel cap and through the first and second internal passages into the fuel tank.

In a further embodiment of any of the foregoing embodiments, the attaching of the first end of the selected cylindrical coupler to the pipe stub includes inserting the pipe stub into the inlet port and clamping the first end of the selected cylindrical coupler radially inwards onto the pipe stub with a first adjustable hose clamp. The attaching the second end of the selected cylindrical coupler to the inlet flange of the fuel tank includes inserting the inlet flange into the outlet port and clamping the second end of the selected cylindrical coupler radially inwards onto the inlet flange with a second adjustable hose clamp.

In a further embodiment of any of the foregoing embodiments, the clamping the first end of the selected cylindrical coupler onto the inlet flange includes arranging the first adjustable hose clamp in a first annular groove of an outer surface of the first end of the selected cylindrical coupler, and tightening the first adjustable hose clamp into the first annular groove. The clamping the selected cylindrical coupler onto the inlet flange includes arranging the second adjustable hose clamp in a second annular groove of the outer surface of the second end of the selected cylindrical coupler, and tightening the second adjustable hose clamp into the second annular groove.

In a further embodiment of any of the foregoing embodiments, the method includes attaching an inlet port of the fuel cap to a first end of a hose, and thereby fluidly connecting the first end of the hose to the fuel tube, attaching the second end of the hose to a fuel outlet of a fuel distribution station, and pumping fuel from the fuel distribution station into the fuel tank through hose, fuel cap, and first and second internal passages.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Examples in the present disclosure describe cylindrical couplers for mounting fuel cap assemblies to inlets of fuel tanks, particularly in mobile fuel distribution. The fuel cap assemblies include a fuel cap, sensor element, and fuel tube. In some examples, a plurality of the cylindrical couplers are provided as a kit or system and each coupler includes an inlet port that can interchangeably connect to the fuel cap (e.g., via a pipe stub) and includes an outlet port sized to accommodate a different size fuel tank inlet flange. The cylindrical couplers facilitate mounting the fuel caps to fuel tanks, so that the fuel tubes and sensor elements can be inserted into and fixed relative to the fuel tanks for refueling operations. As will be described below in greater detail, the inlet port and outlet port have different inner diameters, such that a fuel cap not otherwise sized for securing to a particular fuel tank inlet flange can nevertheless still be securely mounted to the inlet flange.

Figure 1:
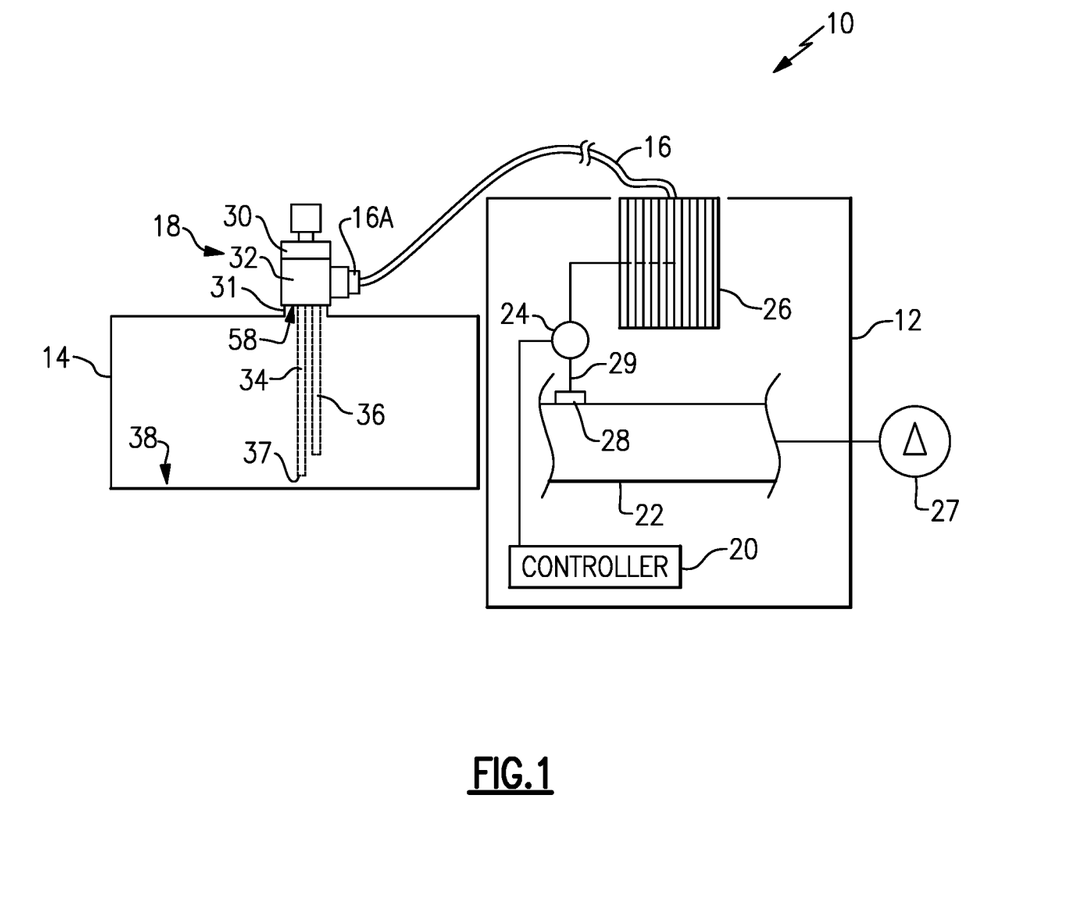
FIG. 1 schematically illustrates an example fuel dispensing system that includes a mobile fuel distribution station and a fuel cap assembly that utilizes a cylindrical coupler to deliver fuel to a fuel tank.

FIG. 1 schematically illustrates an example fuel dispensing system 10 that includes a mobile fuel distribution station 12 operable to refuel fuel tanks 14 (one shown) through a hose 16 and a fuel cap assembly 18. For example, station 12 includes a trailer, container, pallet, or the like. The mobile fuel distribution station 12 includes a controller 20, a manifold 22, a control valve 24, a hose reel 26, and one or more pumps (27). The manifold 22 includes a plurality of outlets 28, one of which is shown in FIG. 1. Fuel line 29 connects the outlet 28 to the hose reel 26. The control valve 24 is in the fuel line 29. The controller 20 is operable to adjust the control valve 24 between open and closed positions to selectively permit fuel flow from the manifold 22 to the hose reel 26 and the hose 16. For example, the control valve 24 is a powered valve, such as a solenoid or pneumatic valve.

The hose 16 in FIG. 1 includes a connector end 16A that connects to the fuel cap assembly 18.

The fuel cap assembly 18 in the illustrated example includes a fuel cap 30, cylindrical coupler 32, a sensor element 34, and a fuel tube 36. The cylindrical coupler 32 defines an internal passage 58 and mounts the fuel cap 30 to an inlet flange 31 of the fuel tank 14, such that the fuel cap assembly 18 is fixed relative to the fuel tank 14 during refueling. The sensor element 34 and fuel tube 36 are adjacent to each other and extend outwards from the fuel cap 30 and through the internal passage 58 into the fuel tank 14, which may correspond to a piece of equipment that is or will be in need of refueling (e.g., a generator, pumper or blender at a hydraulic fracturing site, etc.).

Figure 2:
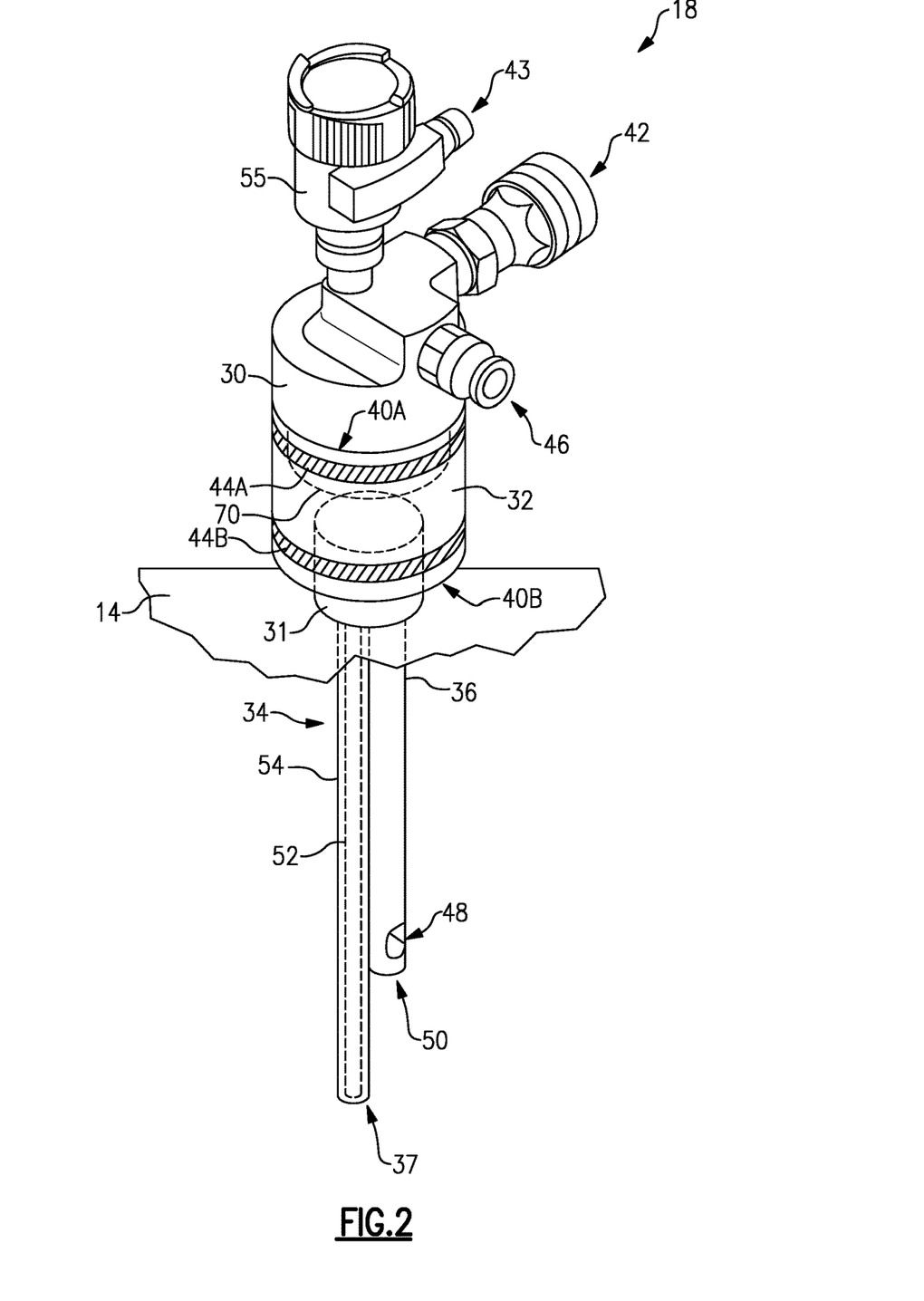
FIG. 2 illustrates an isolated view of the fuel cap assembly and fuel tank of FIG. 1.

FIG. 2 illustrates an isolated view of the fuel cap assembly 18 and fuel tank 14 of FIG. 1. As shown in FIG. 2, the cylindrical coupler 32 includes a first end 40A and an opposing second end 40B. A pipe stub 70 that is secured to the fuel cap 30 is received into the first end 40A, and the inlet flange 31 of fuel tank 14 is received into the second end 40B. The pipe stub 70 and inlet flange 31 have different outer diameters. The cylindrical coupler 32 provides a secure connection and seal between the fuel cap and inlet flange 31 despite that diameter difference.

A first adjustable hose clamp 44A clamps the first end 40A radially inwards onto the pipe stub 70, and a second adjustable hose clamp 44B clamps the second end 40B radially inwards onto the inlet flange 31. The hose clamps 44A-B help create a seal between the pipe stub 70 and inlet flange 31. The cylindrical coupler 32 is at least partially composed of an elastomer, which provides rigidity but also allows the cylindrical coupler 32 to be clamped radially inwards and form a seal against the pipe stub 70 and inlet flange 31. Some useful examples of elastomers include fluoroelastomers (e.g., VITON) and nitrile (e.g., Buna-N). Fluoroelastomers in general provide good resistance to chemicals such as fuel. In one example, the adjustable hose clamps 44B are worm gear hose clamps. Of course, other clamps could be used.

Figure 3:
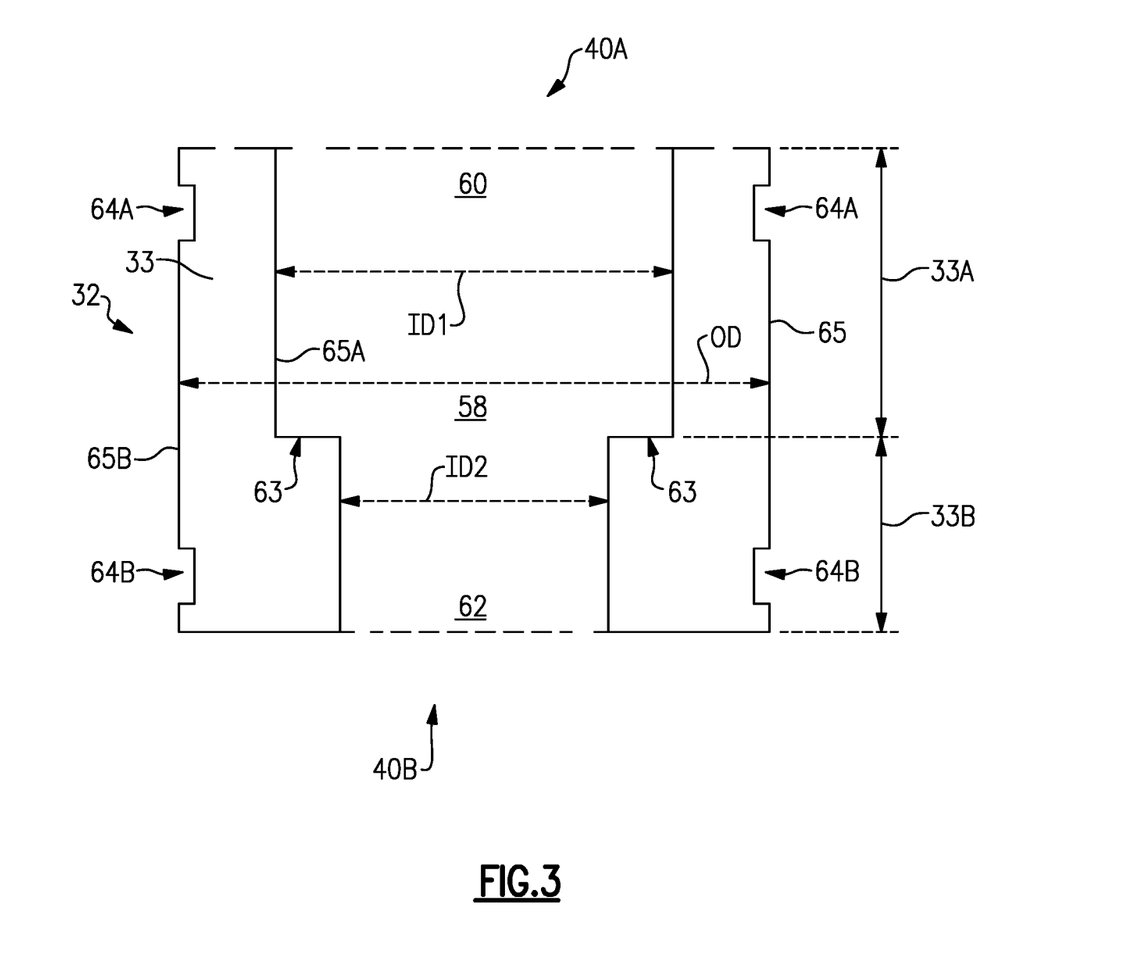
FIG. 3 schematically illustrates a cross-sectional view of the cylindrical coupler of FIG. 2.

FIG. 3 illustrates a cross-sectional view of an example embodiment of the cylindrical coupler 32. As shown in FIG. 3, the cylindrical coupler 32 includes a body 33 having a radially inner surface 65A and a radially outer surface 65B. The radially inner surface 65A defines the internal passage 58 that extends between an inlet port 60 at the first end 40A and an outlet port 62 at the second end 40B. The body 33 includes a first body portion 33A that includes the inlet port 60 and has a first inner diameter ID1. The body 33 also includes a second body portion 33B that includes the outlet port 62 and has a second inner diameter ID2 that differs from ID1 and is typically smaller than ID1. However, in some embodiments ID2 could be larger than ID1.

The radially inner surface 65A includes a step 63 between the first body portion 33A and second body portion 33B. The step 63 provides a transition between the inner diameter ID1 and the inner diameter ID2. The radially outer surface 65B has an outer diameter OD that is greater than ID1 and ID2.

As used herein, the descriptor "cylindrical" as used in the term cylindrical coupler 32 indicates that the body 33 includes the two body portions 33A-B that are each cylindrical along the radially inner surface 65A. In some embodiments, the body 33 is also optionally cylindrical along the radially outer surface 65B as well. However, it is to be understood that the shape of the outer surface 65B is not limited, and that other exterior geometries could be used for the body 33.

The first end 40A of the body 33 includes a first annular groove 64A in the radially outer surface 65B of the cylindrical coupler 32. The first annular groove 64A is sized to receive the first adjustable hose clamp 44A, and the second end 40B of the body 33 includes a second annular groove 64B in the radially outer surface 65B that is sized to receive the second adjustable hose clamp 44B. In the example of FIG. 3, outside of the annular grooves 64A-B, the outer diameter OD is substantially the same along an entire length of the body 33.

Figure 4:
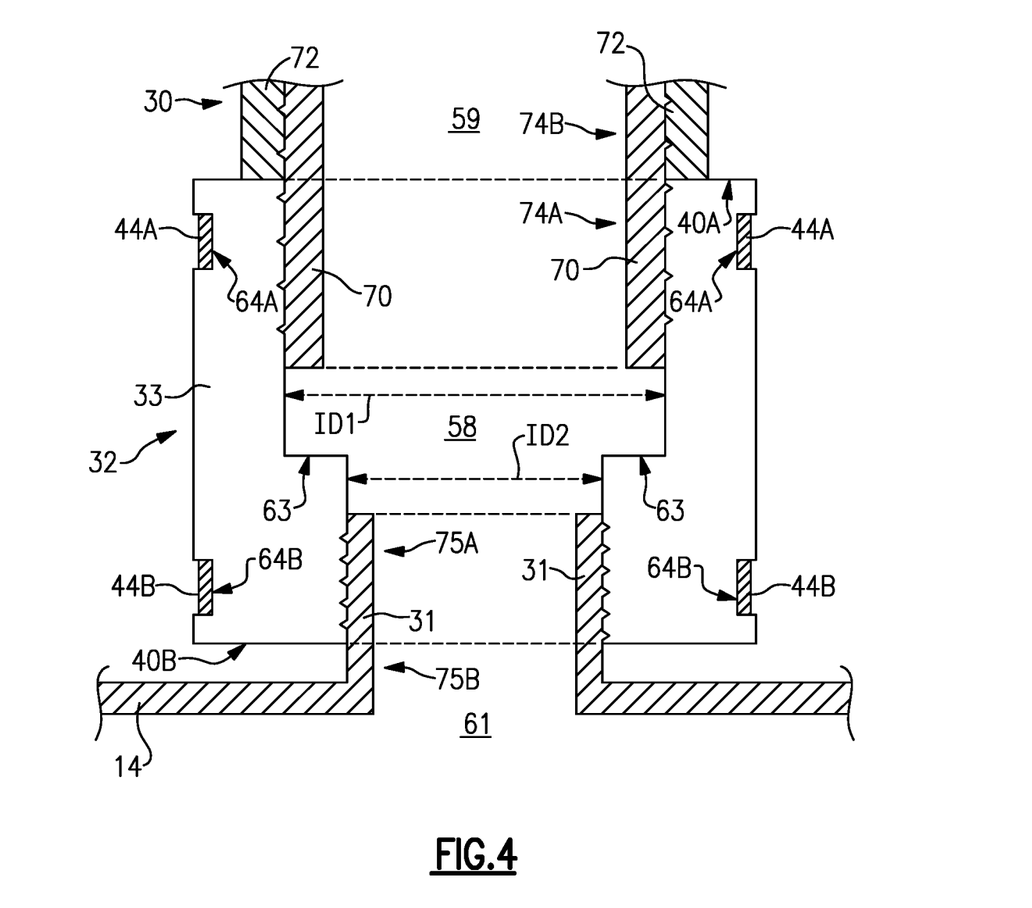
FIG. 4 schematically illustrates the cylindrical coupler of FIG. 3 in the fuel cap assembly of FIG. 1.

FIG. 4 schematically illustrates the cylindrical coupler 32 in the fuel cap assembly 18. As shown in FIG. 4, the first end 40A of the body 33 receives and engages a threaded pipe stub 70. The pipe stub 70 also is received into and engages a threaded flange 72 of the fuel cap 30. Thus, a first portion 74A of the pipe stub 70 is received into the cylindrical coupler 32, and second portion 74B of the pipe stub 70 is received into the threaded flange 72 of the fuel cap 30.

The second end 40B of the body 33 receives and engages the threaded inlet flange 31 of the fuel tank 14, such that a portion 75A of the inlet flange 31 is received into the cylindrical coupler 32, and a portion 75B of the inlet flange 31 is outside of the cylindrical coupler 32.

Although the sensor element 34 and fuel tube 36 are not shown for simplicity in FIG. 4, the sensor element 34 and fuel tube 36 extend through the internal passage 59 of pipe stub 70, through the internal passage 58 of cylindrical coupler 32, and through an internal passage 61 of the inlet flange 31 into the fuel tank 14. In the example of FIG. 4, the pipe stub 70 and inlet flange 31 are spaced apart from each other within the internal passage 58.

Hose clamp 44A is received into annular groove 64A, and clamps the first end 40A onto the pipe stub 70. Hose clamp 44B is received into annular groove 64B, and clamps the second end 40B onto the inlet flange 31. Thus, despite the difference in size between the inner diameter of the threaded flange 72 (ID1) and outer diameter of the fuel tank inlet flange 31 (ID2), the cylindrical coupler 32 is able to securely couple the fuel cap 30 to the fuel tank 14, and form a seal therebetween.

Figure 5:
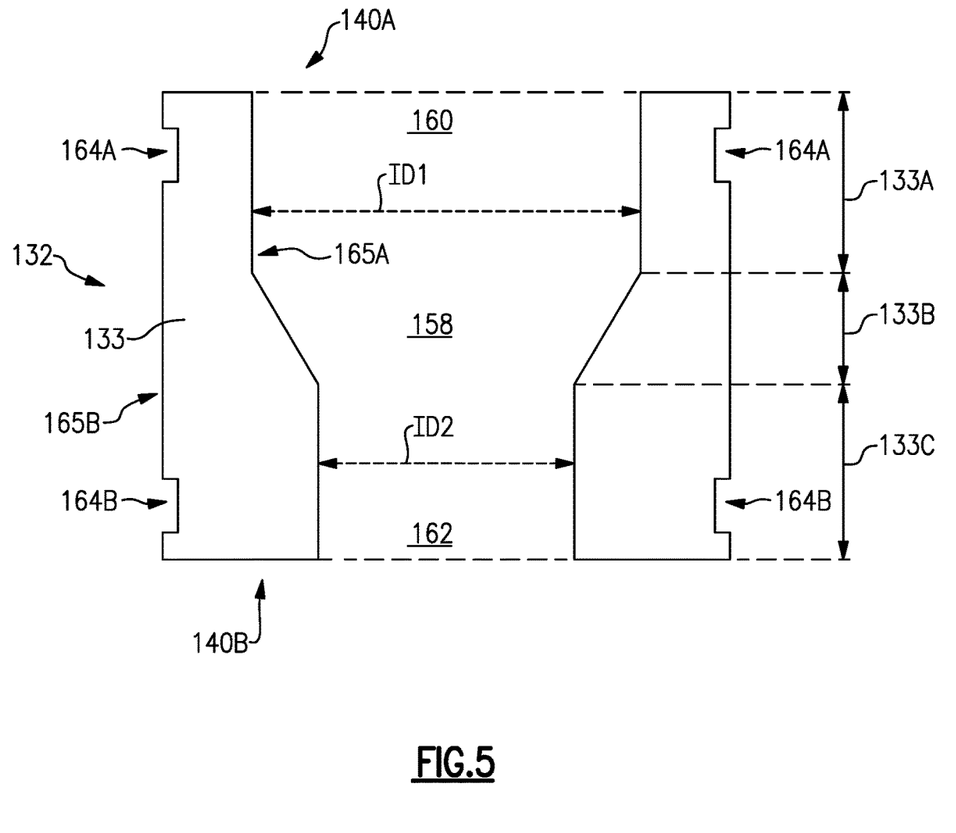
FIG. 5 schematically illustrates another example cylindrical coupler.

FIG. 5 schematically illustrates another example cylindrical coupler 132. The cylindrical coupler 132 includes a body 133 having a radially inner surface 165A and a radially outer surface 165B. The radially inner surface 165A defines an internal passage 158 that extends between inlet port 160 at first end 140A and outlet port 162 at second end 140B. The body includes a first body portion 133A, second body portion 133B, and third body portion 133C.

The first body portion 133A includes the inlet port 160 and has an inner diameter ID1. The third body portion 133C includes the outlet port 162 and has an inner diameter ID2. The second body portion 133B is a frustoconical section that tapers the internal passage 158 from the inner diameter ID1 to the inner diameter ID2. In an alternative embodiment in which ID2 is greater than ID1, the frustoconical section 163 could taper from ID2 to ID1.

In one example, the fuel cap 30, sensor element 34, fuel tube 36, pipe stub 70, and cylindrical coupler 32/132 are part of a kit that includes a plurality of cylindrical couplers 32/132. The plurality of cylindrical couplers 32/132 can interchangeably connect to the pipe stub 70 at their respective first ends 40A/140A, and have respective inner diameters ID2 at their respective second ends 40B/140B that are different from each other to accommodate a variety of different fuel tank inlet flange 31 sizes. The couplers 32/132 enable one size of fuel cap 30 of the fuel cap assembly 18 to be fit to a variety of different sizes of fuel tank inlet flanges 31. Thus, a technician could use the kit at a work site to secure the fuel cap assembly 18 to the inlet flange 31 of the fuel tank 14 without advance knowledge of the size of the diameter of the inlet flange that needs to be accommodated. This provides great flexibility for the technician, and avoids the needs to transport large quantities of fuel caps 30 of different sizes, because the variety of cylindrical couplers 32/132 can accommodate differences in size between the inner diameter of the threaded flange 72 of the fuel cap 30 and the outer diameter of the inlet flange 31 of the fuel tank 14

Figure 6:
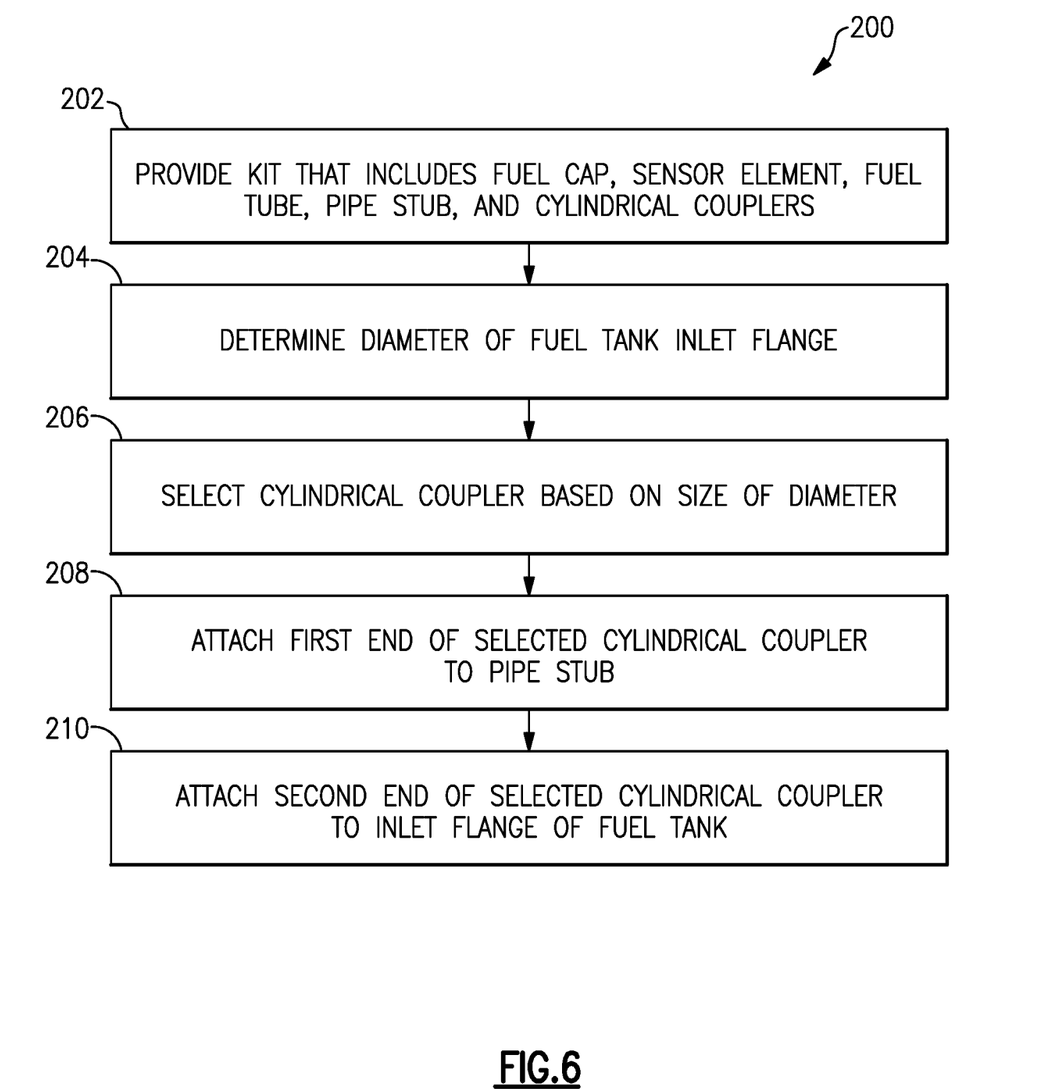
FIG. 6 is a flowchart of an example method of mounting a fuel cap assembly to a fuel tank.

FIG. 6 is a flowchart of an example method 200 of mounting the fuel cap assembly 18 to the fuel tank 14. A kit as described above is provided (step 202) that includes the fuel cap 30, sensor element 34, and fuel tube 36, and a pipe stub 70, and a plurality of the cylindrical couplers 32/132 having differing inner diameters ID2 at their respective outlet ports 62/162. If the pipe stub 70 is not already coupled to the fuel cap 30, it is coupled (e.g., as depicted in FIG. 4 through a threaded engagement).

A user determines an outer diameter of inlet flange 31 of the fuel tank 14, such as through measurement and/or a visual inspection (step 204). The user selects a cylindrical coupler 32/132 from the kit which corresponds to the determined size of the fuel tank inlet flange 31 (step 206). In one example, this includes selecting the cylindrical coupler 32 having a second inner diameter ID2 that is the closest to the outer diameter of the inlet flange 31 of all the cylindrical couplers 32 in the kit.

The user attaches the first end 40A of the selected cylindrical coupler 32/132 to the pipe stub 70 by inserting the pipe stub 70 into the inlet 60/160 of the cylindrical coupler 32/132 (e.g., as shown in FIG. 4) (step 208). Optionally, the user may situate clamp 44A in annular groove 64A/164A and tighten the clamp into the annular groove as part of the attachment, which compresses the first end 40A/140A of the cylindrical coupler 32/132 onto the pipe stub 70 and tightens a seal against the pipe stub 70.

The user mounts the second end 40B of the selected cylindrical coupler 32/132 to the inlet flange 31 by inserting the inlet flange 31 into the outlet 62/162 of the cylindrical coupler 32/132 (step 210). Optionally, the user may situate clamp 44B in annular groove 64B/164B and tighten the clamp into the annular groove in conjunction with step 208 as part of the attachment, to compress the cylindrical coupler 32/132 onto the inlet flange 31 and tighten a seal against the inlet flange 31.

A plurality of the kits could be provided, such that the method could be repeatedly performed for a plurality of fuel tanks 14 at a given site. Also, the method could be repeatedly performed at a plurality of different sites, e.g., such that different sized ones of the cylindrical couplers 32/132 from the kit are used for fuel tanks having differently-sized inlet flanges 31 at different work sites.

Once the fuel cap assembly 18 is attached to the fuel tank, fueling operations can then be conducted, with the fuel tube 36 delivering fuel into the fuel tank 14, and the sensor element 34 generating signals indicative of the fuel level in the fuel tank 14 and providing the signals to the controller 20 of the mobile fuel distribution station 12. The controller 20 uses the signals to determine whether the control valve 24 should be adjusted (e.g., opened or closed). Once the equipment being fueled is no longer used at a given work site and further refueling is not needed the work site, the user can detach the fuel cap assemblies 18 from the fuel tanks.

Other aspects of the fuel dispensing system 10 will now be described in greater detail. Referring to FIG. 1, the fuel cap assembly 18 provides a fluid connection between the hose 16 and an inlet end (not shown) of the fuel tube 36. In the example of FIG. 1, the sensor element 34 and fuel tube 36 are both substantially perpendicular to the bottom 38 of the fuel tank 14. However, it is understood that other arrangements could be used where the sensor element 34 and fuel tube 36 are inserted into the fuel tank 14 to point downwards, but are not perpendicular to the bottom 38. In one example, when the fuel cap assembly 18 is mounted to the fuel tank 14, a distal end 37 of the sensor element 34 is less than six inches away from the bottom 38 of the fuel tank 14.

At least the control valve 24 and sensor element 34 are in communication with the controller 20. As an example, the controller 20 includes processing circuitry configured to carry out any of the functions described herein. In one further example, the controller 20 includes a programmable logic controller (PLC) with a touch-screen for user input and display of status data. For example, the screen may simultaneously show multiple fluid levels of the equipment that is being serviced.

The sensor element 34 transmits signals to the controller 20 that are indicative of a fuel level in the fuel tank 14. The controller 20 interprets the signals and determines the fuel level for the fuel tank 14. In response to a fuel level that falls below a lower threshold, the controller 20 opens the control valve 24 associated with the hose 16 and activates the one or more pumps 27 to provide fuel flow into the manifold 22 and through the open control valve 24 and reel 26 such that fuel is provided through the hose 16 and fuel cap assembly 18 into the fuel tank 14. The lower threshold may correspond to an empty fuel level of the fuel tank 14, but more typically the lower threshold will be a level above the empty level to reduce the potential that the equipment completely runs out of fuel and shuts down.

The controller 20 also determines when the fuel level in the fuel tank 14 reaches an upper threshold. The upper threshold may correspond to a full fuel level of the fuel tank 14, but more typically the upper threshold will be a level below the full level to reduce the potential for overflow. In response to reaching the upper threshold, the controller 20 closes the respective control valve 24 and ceases the one or more pumps.

Although only a single hose 16, reel 26, control valve 24, outlet 28, and fuel cap assembly 18 are shown in FIG. 1, it is understood that there could be a plurality of these, such that the manifold 22 has a plurality of outlets 28, each connected to a respective hose 16 on a respective hose reel 26, with each hose 16 being connected to a respective fuel cap assembly 18 of a respective fuel tank 14, and each hose 16 having a respective associated control valve 24. In such an example, even if a particular one of the control valves 24 is being shut down, the pump(s) 27 may remain on to fuel others of the fuel tanks 14 if others of the control valves 24 are open or are to be opened. Multiple control valves 24 may be open at one time, to provide fuel to multiple fuel tanks 14 at one time.

Additionally, the controller 20 may have a manual mode in which a user can control at least some functions through the PLC, such as starting and stopping the pump(s) 27 and opening and closing control valves 24. For example, a manual mode may be used at the beginning of a job when initially filling fuel tanks 14 to levels at which the sensor elements 34 can detect fuel and/or during a job if a sensor element 34 becomes inoperable. Of course, operating in manual mode may deactivate some automated functions, such as filling at the low threshold or stopping at the high threshold.

Referring to FIG. 2, the fuel cap 30 of the assembly 18 includes a hose port 42, a sensor wire port 43, and a vent port 46. The hose port 42 is detachably connectable to the connector end 16A of hose 16 (e.g., using a dry disconnect fitting). The sensor wire port 43 is detachably connectable to a sensor wire (not shown) that provides for communication between the sensor element 34 and the controller 20. Alternatively, wireless communication could be used for the sensor element 34 to communicate with the controller 20. The vent port 46 may be provided for attaching to a drain hose to drain any overflow into a containment bucket and/or reduce air pressure build-up in the fuel tank 14. Thus, a user may first mount the fuel cap 30 to the inlet 31 of the fuel tank 14 of the equipment, followed by connecting the hose 16 to the port 42, connecting a sensor wire to the port 43, and optionally connecting a drain hose to vent port 46.

The fuel tube 36 that delivers fuel into the fuel tank 14 includes an outlet end 50 having at least one fuel outlet 48 for dispensing fuel received through the hose port 42. In the example of FIG. 2, the fuel outlet 48 is a side-diverting fuel outlet 48 in a sidewall of the fuel tube 36. However, it is understood that other types of fuel outlets could be used (e.g., an outlet in an axial end wall of the fuel tube 36). The fuel tube 36 also has an inlet end (not shown) that is opposite the outlet end 50 and is disposed within the fuel cap 30.

The sensor element 34 includes a sensor probe 52 disposed within a protective sheath 54. In the non-limiting example of FIG. 2, the protective sheath 54 is a tube. However, other protective sheath geometries could be used. The protective sheath 54 may be a metal alloy (e.g., stainless steel or aluminum) or polymer tube that surrounds the sensor probe. One or more bushings may be provided between the sensor probe 52 and the protective sheath 54, to separate the sensor probe 52 from the sheath 54. The sheath 54 shields the sensor probe 52 from contact by external objects, the walls of a fuel tank 14, and other components in the fuel tank 14, which might otherwise increase the potential for faulty sensor readings.

The sensor element 34 is operatively connected to a sensor device 55 that utilizes the sensor probe 52 to measure a fuel level in the fuel tank 14. The sensor device 55 may be any type of sensor that is capable of detecting fluid or fuel level in a tank. In one example, the sensor device 55 is a guided wave radar sensor that operates as a transmitter/sensor that emits radar waves, most typically radio frequency waves, down the sensor probe 52, and measures reflected radar waves to determine a fluid level in the fuel tank 14. The sensor probe 52 serves as a guide for the radar waves. The radar waves reflect off a surface of the fuel and the reflected radar waves are received into the transmitter/sensor. The sensor device 55 provides a measurement that is indicative of the "time of flight" of the radar waves, i.e., how long it takes from emission of the radar waves for the radar waves to reflect back to the transmitter/sensor. Based on the measurement, the sensor device 55 or the controller 20 can determine the distance that the radar waves travel. A longer distance thus indicates a lower fuel level (farther away) and a shorter distance indicates a higher fuel level (closer).

Figure 7:
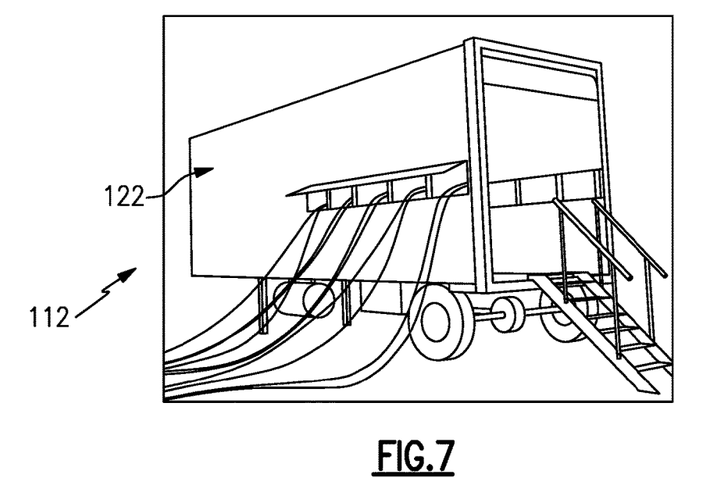
FIG. 7 schematically illustrates an example implementation of the mobile fuel distribution station of FIG. 1.
Figure 8:
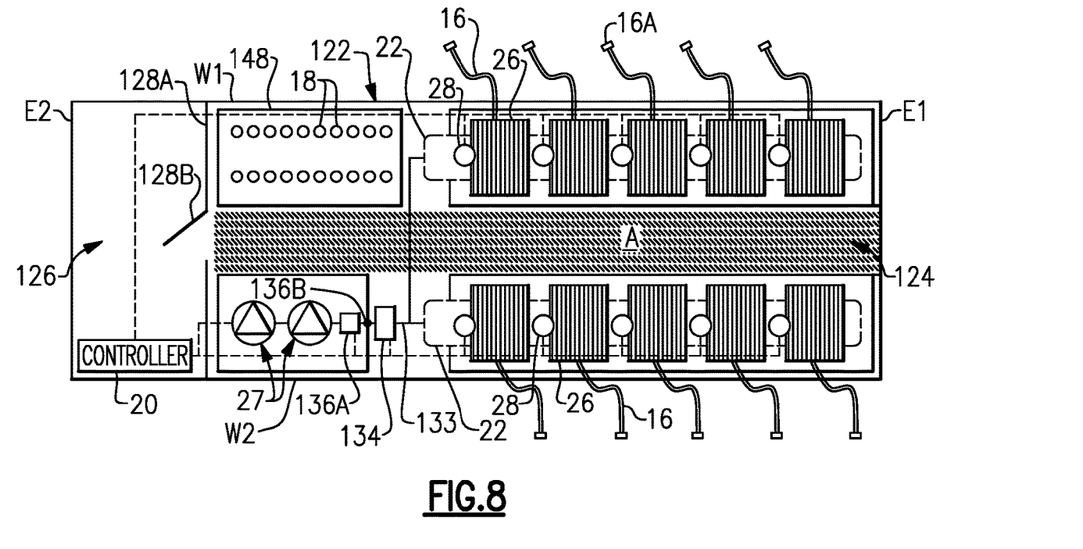
FIG. 8 illustrates an example internal layout of the mobile fuel distribution station of FIG. 7.

FIG. 7 schematically illustrates a mobile fuel distribution station 112 that is an example implementation of the mobile fuel distribution station 12 of FIG. 1, and FIG. 8 illustrates an example internal layout of the example station 112 of FIG. 7. The station 12/112 may be utilized to distribute fuel in a "hot-refueling" capacity to multiple pieces of equipment while the equipment is running at a work site, such as hydraulic fracturing equipment (e.g., pumpers and blenders) at a well site, or electrical generators. Of course, these are non-limiting examples, and it is understood that the station 12/112 may be used in mobile delivery of fuel to the same or items in other environments as well. Also, it is understood that the fuel cap assemblies 18 and cylindrical couplers 32 can be used with mobile fuel distribution stations other than those depicted in FIGS. 7-8.

In the depicted example, the station 112 includes a mobile trailer 122. Generally, the mobile trailer 122 is elongated and has first and second opposed trailer sidewalls W1 and W2 that join first and second opposed trailer end walls E1 and E2. Most typically, the trailer 122 will also have a closed top (not shown). The mobile trailer 122 may have wheels that permit the mobile trailer 122 to be moved by a vehicle from site to site to service different hot-refueling operations. In the depicted example, the mobile trailer 122 has two compartments. A first compartment 124 includes the physical components for distributing fuel and a second compartment 126 serves as an isolated control room for managing and monitoring fuel distribution. The compartments 124/126 are separated by an inside wall 128A that has an inside door 128B.

The first compartment 124 includes one or more pumps 27. Fuel may be provided to the one or more pumps 27 from an external fuel source, such as a tanker truck on the site. On the trailer 122, the one or more pumps 27 are fluidly connected to one or more manifolds 22 via a fluid line 133. The fluid line 133 may include, but is not limited to, hard piping. The fuel line 133 may include a filtration and air eliminator system 136A, one or more sensors 136B, and/or a register 134 for metering the fluid. Although optional, the system 136A is beneficial in many implementations to remove foreign particles and air from the fuel prior to delivery to the equipment. The one or more sensors 136B may include a temperature sensor, a pressure sensor, or a combination thereof, which assist in fuel distribution management.

In one example, the controller 20 tracks the amount of fuel provided to the respective fuel tanks 14. For instance, the register 134 precisely measures the amount of fuel provided from the pump or pumps 27. As an example, the register 134 is an electronic register and has a resolution of about 0.1 gallons. The register 134 communicates measurement data to the controller 20. The controller 20 can thus determine the total amount of fuel used to very precise levels. The controller 20 may also be configured to provide outputs of the total amount of fuel consumed. For instance, a user may program the controller 20 to provide outputs at desired intervals, such as by worker shifts or daily, weekly, or monthly periods. The outputs may also be used to generate invoices for the amount of fuel used. As an example, the controller 20 may provide a daily output of fuel use and trigger the generation of an invoice that corresponds to the daily fuel use, thereby enabling almost instantaneous invoicing.

In the illustrated example, the station 112 includes two manifolds 22 that are arranged on opposed sides of the compartment 124. As an example, the manifolds 22 are elongated tubes that are generally larger in diameter than the fuel line 133 and that have at least one inlet and multiple outlets. A plurality of hoses 16 are provided. In the depicted example, each hose 16 is wound, at least initially, on a reel 26 that is rotatable to extend or retract the hose 16 externally through one or more windows of the trailer 122. Each reel 26 may have an associated motor to mechanically extend and retract the hose 16. As will be appreciated, fewer or additional reels and hoses may be used in alternative examples.

In the illustrated example, the first compartment 124 also includes a sensor support rack 148 that can be used for storing the fuel cap assemblies 18 and/or kits described above when not in use. Each hose 16 may include a connector end 16A and each fuel cap assembly 18 may have a corresponding mating connector (e.g., the port 42) to facilitate rapid connection and disconnection of the hose 16. For example, the connector end 16A and a mating connector on the fuel cap assembly 18 may form a hydraulic quick-connect.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A fuel dispensing system comprising:
    a mobile fuel distribution station including a manifold having a plurality of outlets;
    a plurality of hoses, each hose having a first end configured to receive fuel from a respective one of the outlets, and an opposing second end; and
    a plurality of fuel cap assemblies, each including:
        a fuel cap;
        a pipe stub that extends from the fuel cap and defines a first internal passage;
        a sensor element and a fuel tube adjacent to each other and both extending from the fuel cap through the first internal passage, the fuel tube configured to receive fuel through the fuel cap from the second end of a respective one of the hoses; and
        a cylindrical coupler composed of an elastomer and defining a second internal passage that extends between an inlet port and an outlet port, the inlet port having a first inner diameter and the pipe stub being receivable into the inlet port, the outlet port having a second inner diameter that differs from the first inner diameter.

2. The fuel dispensing system of claim 1, wherein outside of the first and second annular grooves, each cylindrical coupler has an outer diameter that is substantially the same along an entire length of the cylindrical coupler.

3. The fuel dispensing system of claim 1, wherein the second inner diameter is less than the first inner diameter.

4. The fuel dispensing system of claim 1, wherein an inner surface of the cylindrical coupler includes a frustoconical section that transitions the second internal passage from the first inner diameter to the second inner diameter.

5. The fuel dispensing system of claim 1, wherein a radially inner surface of the cylindrical coupler includes a step that transitions the second internal passage from the first inner diameter to the second inner diameter.

6. The fuel dispensing system of claim 1, wherein for each respective fuel cap assembly, the respective second diameter is less than the respective first inner diameters.

7. The fuel dispensing system of claim 1, wherein each fuel cap assembly includes:
    a first adjustable hose clamp that is disposed in a first annular groove in an outer surface of the first end of the cylindrical coupler and clamps the first end radially inwards onto the pipe stub; and
    a second adjustable hose clamp that is disposed in a second annular groove in an outer surface of the second end of the cylindrical coupler and clamps the second end radially inwards.

8. The fuel dispensing system of claim 7, wherein for each fuel cap assembly:
    an inner surface of the cylindrical coupler includes a frustoconical section that transitions the second internal passage from the first inner diameter to the second inner diameter; and
    the frustoconical section is disposed between the first annular groove and the second annular groove.

9. The fuel dispensing system of claim 7, wherein for each fuel cap assembly:
    a radially inner surface of the cylindrical coupler includes a step that transitions the second internal passage from the first inner diameter to the second inner diameter; and
    the step is disposed between the first annular groove and the second annular groove.

10. A fuel dispensing system comprising:
    a mobile fuel distribution station including a manifold having a plurality of outlets;
    at least one hose, each hose having a first end configured to receive fuel from a respective one of the outlets, and an opposing second end; and
    at least one fuel cap assembly, each including:
        a fuel cap;
        a pipe stub that extends from the fuel cap and defines a first internal passage;
        a sensor element and a fuel tube adjacent to each other and both extending from the fuel cap through the first internal passage, the fuel tube configured to receive fuel through the fuel cap from the second end of a respective one of the at least one hoses; and
        a cylindrical coupler defining a second internal passage that extends between an inlet port and an outlet port, the inlet port having a first inner diameter and the pipe stub being receivable into the inlet port, the outlet port having a second inner diameter that differs from the first inner diameter.

11. The fuel dispensing system of claim 10, wherein outside of the first and second annular grooves, each cylindrical coupler has an outer diameter that is substantially the same along an entire length of the cylindrical coupler.

12. The fuel dispensing system of claim 10, wherein the second inner diameter is less than the first inner diameter.

13. The fuel dispensing system of claim 10, wherein an inner surface of the cylindrical coupler includes a frustoconical section that transitions the second internal passage from the first inner diameter to the second inner diameter.

14. The fuel dispensing system of claim 10, wherein a radially inner surface of the cylindrical coupler includes a step that transitions the second internal passage from the first inner diameter to the second inner diameter.

15. The fuel dispensing system of claim 10, wherein for each respective fuel cap assembly, the respective second diameter is less than the respective first inner diameters.

16. The fuel dispensing system of claim 10, wherein each fuel cap assembly includes:
    a first adjustable hose clamp that is disposed in a first annular groove in an outer surface of the first end of the cylindrical coupler and clamps the first end radially inwards onto the pipe stub; and
    a second adjustable hose clamp that is disposed in a second annular groove in an outer surface of the second end of the cylindrical coupler and clamps the second end radially inwards.

17. The fuel dispensing system of claim 16, wherein for each fuel cap assembly:

an inner surface of the cylindrical coupler includes a frustoconical section that transitions the second internal passage from the first inner diameter to the second inner diameter; and the frustoconical section is disposed between the first annular groove and the second annular groove.

18. The fuel dispensing system of claim 16, wherein for each fuel cap assembly:

a radially inner surface of the cylindrical coupler includes a step that transitions the second internal passage from the first inner diameter to the second inner diameter; and the step is disposed between the first annular groove and the second annular groove.

\* \* \* \* \*